March 28, 1961 B. H. STEINHARD 2,976,650
MACHINE TOOL WORKPIECE LOADING MECHANISM
Filed Sept. 22, 1959 6 Sheets-Sheet 2

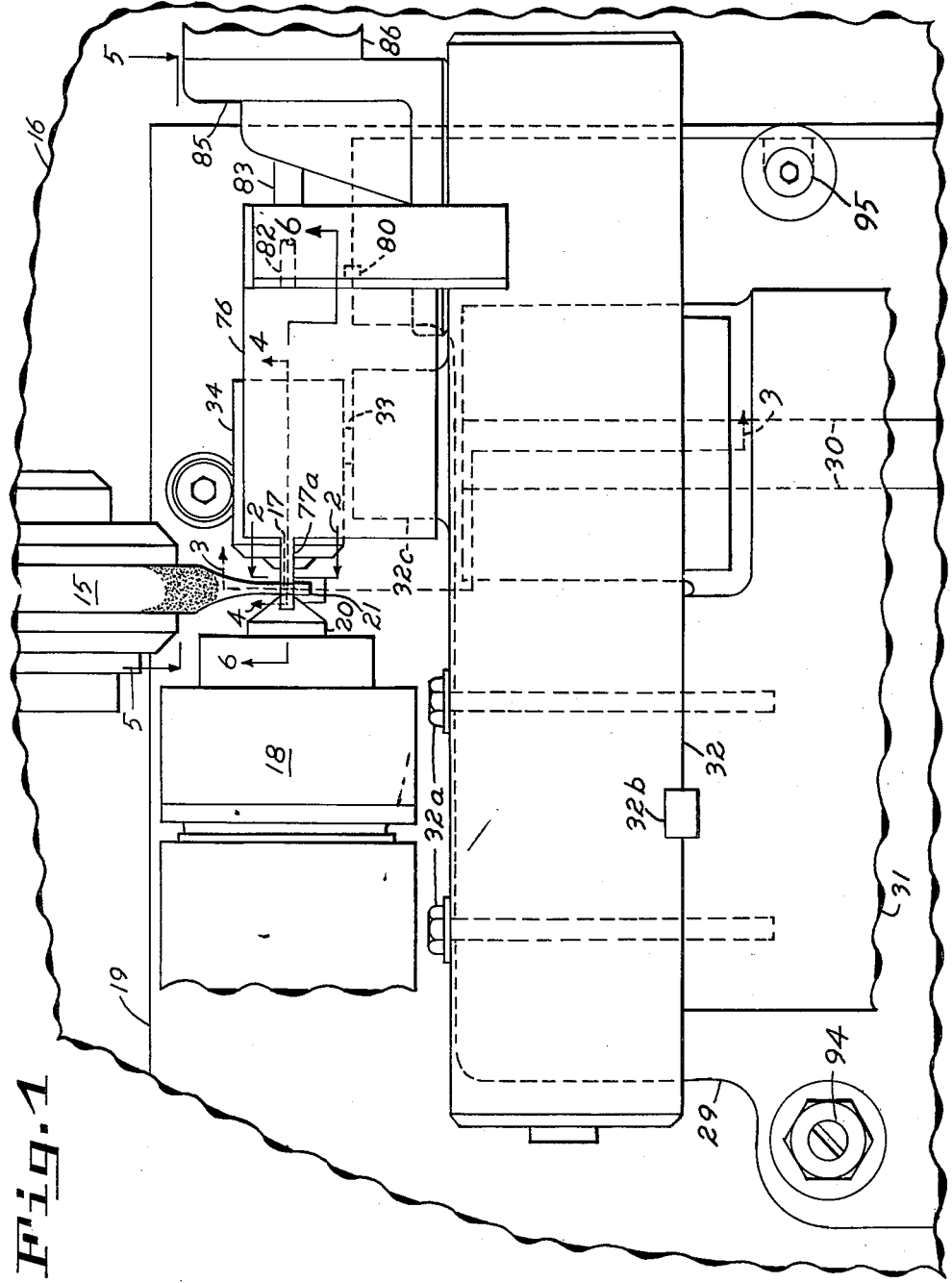

INVENTOR.
BERTRAM H. STEINHARD
BY Howard Keiser
& John F. Verhoeven
ATTORNEYS

March 28, 1961 B. H. STEINHARD 2,976,650
MACHINE TOOL WORKPIECE LOADING MECHANISM
Filed Sept. 22, 1959 6 Sheets-Sheet 4

INVENTOR.
BERTRAM H. STEINHARD
BY Howard Keiser
& John F. Verhoeven
ATTORNEYS

March 28, 1961  B. H. STEINHARD  2,976,650
MACHINE TOOL WORKPIECE LOADING MECHANISM
Filed Sept. 22, 1959  6 Sheets-Sheet 5

INVENTOR.
BERTRAM H. STEINHARD
BY Howard Keim
& John F. Verhoeven
ATTORNEYS

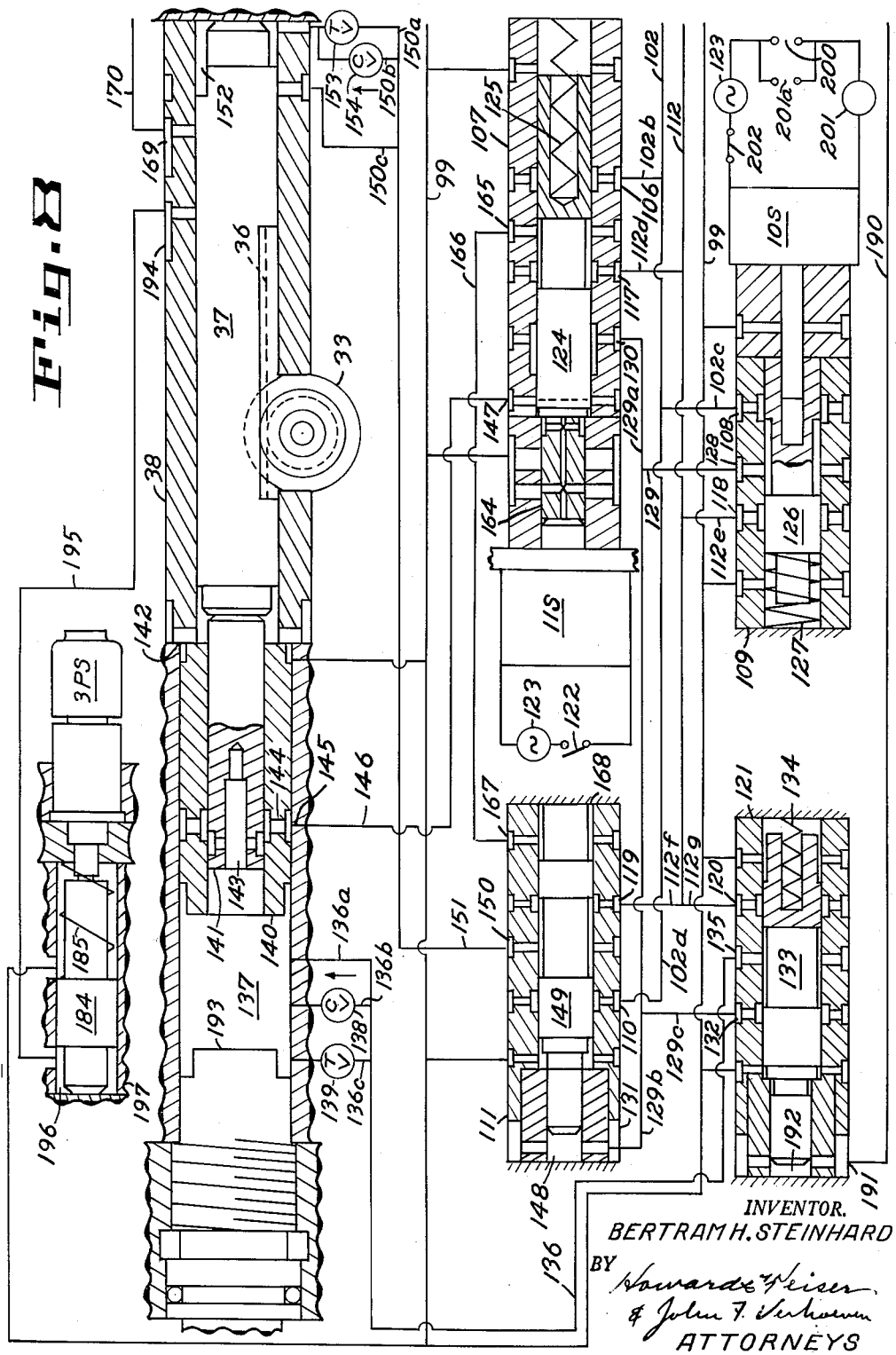

United States Patent Office 2,976,650
Patented Mar. 28, 1961

2,976,650

MACHINE TOOL WORKPIECE LOADING MECHANISM

Bertram H. Steinhard, Cincinnati, Ohio, assignor to The Cincinnati Milling Machine Co., Cincinnati, Ohio, a corporation of Ohio Filed Sept. 22, 1959, Ser. No. 841,557

8 Claims. (Cl. 51—103)

The present invention relates to a workpiece handling mechanism for a machine tool, particularly suited for a grinding machine of the type in which the workpiece is urged into driving engagement with a rotatable driver during grinding.

In one type of grinding machine, as described in U.S. Patent 2,478,607 of Theler and Mehlhope dated August 9, 1949, a workpiece of circular cross section is supported on shoes adjacent the grinding wheel and is rotated by a driver having a rotating face engaged with one end of the workpiece. The workpiece is engaged with the rotating driving face in off-center relationship so that the workpiece periphery is continuously urged down against the supporting shoes as the workpiece is rotated. Since the shoes are fixed, and the axis of the workpiece is off-center relative to the axis of rotation of the fixed driver face, the end of the workpiece engaged with the driver face must be free to slide on that face and, consequently, cannot be rigidly secured thereto. Instead, the workpiece is held on the shoes against the driver face, and appropriate driving engagement between the workpiece and the driver face is effected, by urging the workpiece against said face, either by magnetic means in the driver, or by a pressure member adapted to engage the opposite end of the workpiece, or both. The latter means is generally required where the area of the workpiece engaging the driver is too small to permit a sufficiently strong driving engagement by magnetic means alone.

In the mechanism of the present invention, which is well suited for handling small annular workpieces, the pressure member is utilized, not only to urge the workpieces into driving engagement with the driver, but also to carry the workpieces to the driver for grinding. In the preferred form of the invention, the pressure member, which has a finger at one end to loosely receive and carry a workpiece, is rotatably mounted in a housing which is pivotally supported to swing the finger from an unoperated workpiece storage chute, where a workpiece is transferred onto the finger, to workpiece supporting shoes at the driver on which the workpiece is deposited. After the workpiece is deposited at the driver the pressure member is shifted to urge the workpiece into driving engagement with the driver. After the grinding operation the housing is reversely swung to a discharge position and the finger, which remains in the workpiece during grinding, carries the workpiece to said position where the workpiece is disengaged therefrom.

Preferably the pressure member comprises a spindle, loosely received in a chamber defined by an air bearing, and axially movable therein. After the workpiece has been deposited at the driver, air under pressure is passed through the chamber and about the spindle to float the spindle therein. Also air under pressure is directed into the chamber at one end against one end of the spindle, which terminates in the chamber, to shift the floating spindle toward the driver. As one end of the workpiece is urged against the driver by engagement of the spindle against the other end thereof, the spindle freely rotates in the chamber. Moreover, if the ends of the workpiece are not perfectly square, the spindle, since it is floatingly supported, can tilt to assure full seating engagement on the workpiece and full seating engagement of the workpiece on the driver, obviating any tendency of the workpiece to tilt, or rock, on the driver during grinding.

It is therefore an object of the present invention to provide a member for holding a workpiece in operating position in a machine tool which is operable to load the workpiece into operating position. It is another object of the present invention to provide a pressure member for loading and holding a workpiece in operating position which is floatingly supported for easy rotation and tiltable to seat fully against the workpiece. Other objects and advantages of the present invention should be readily apparent by reference to the following specification, considered in conjunction with the accompanying drawings forming a part thereof, and it is to be understood that any modifications may be made in the exact structural details there show and described, within the scope of the appended claims, without departing from or exceeding the spirit of the invention.

In the drawings:

Fig. 1 is a plan view of a grinding machine with the workpiece handling mechanism of the present invention;

Figs. 7 and 8 are schematic diagrams of the hydraulic system of the present invention.

Figure 2:
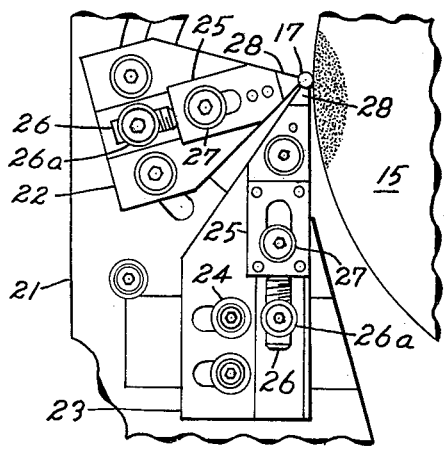
Fig. 2 is a view taken on line 2—2 of Fig. 1.

The machine shown to illustrate the present invention, as shown in Fig. 1, has a grinding wheel 15 mounted on the base 16 of the machine for movement towards and away from the workpiece 17 by any suitable mounting and feeding means, which means form no part of the present invention. The headstock 18 of the machine, mounted on a plate 19, has a rotatable driver 20 terminating in a magnetic driver face 20a. On the headstock plate 19 adjacent the headstock there is adjustably mounted a bracket 21 carrying means to support a workpiece at the driver face. As shown in Fig. 2, plates 22 and 23 are secured to the bracket 21 in adjusted position about the workpiece by bolts 24 received through slots in the bracket. Each plate 22, 23 has block 25 adjustable towards and away from the workpiece by set screws 26 mounted in studs 26a, the blocks 25 being secured to the plates by bolts 27. The blocks 25 have blades 28 secured therein at their outer ends which are contoured at their tips to engage the outer surface of the annular workpiece, the blades defining spaced shoes to support the workpiece in grinding position at the driver face.

Figure 3:
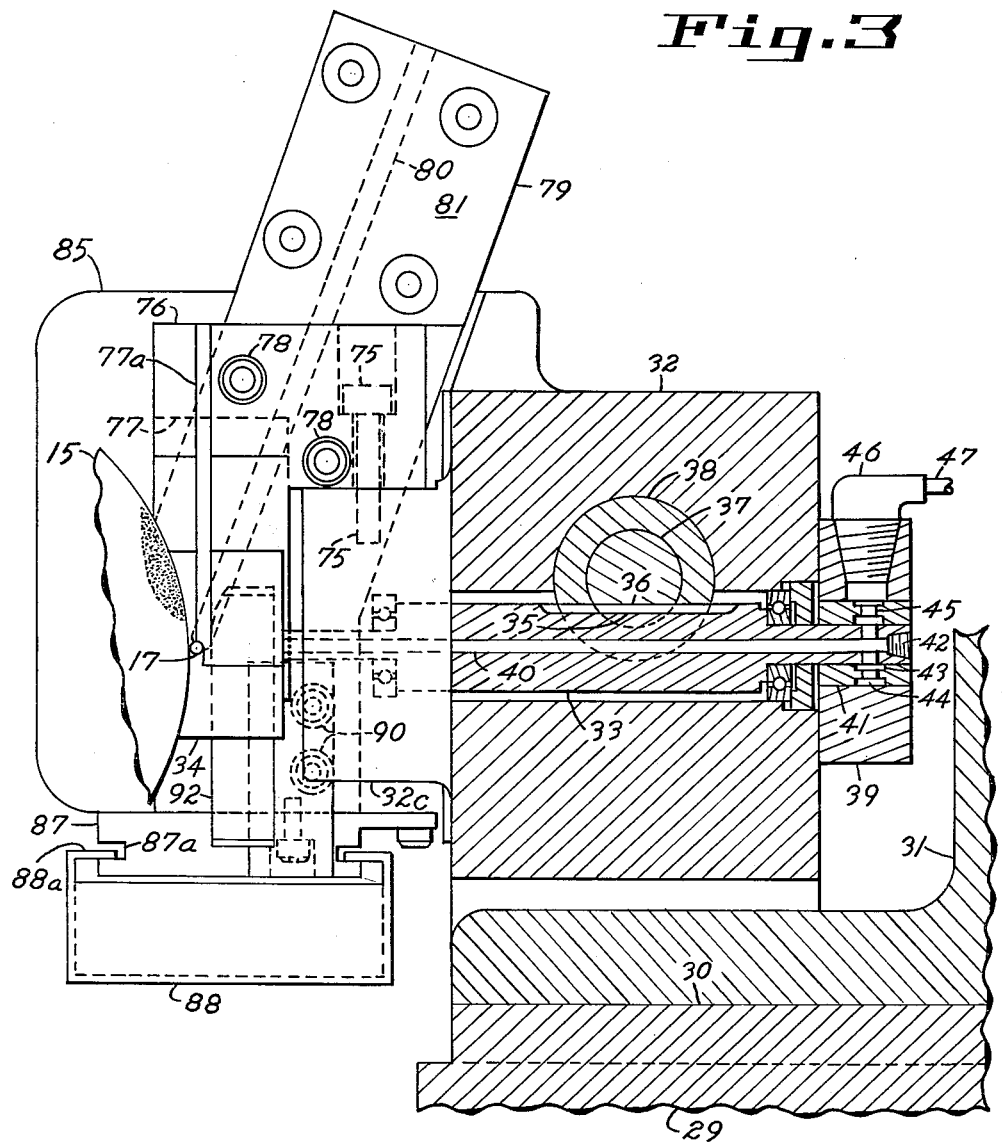
Fig. 3 is a view taken on line 3—3 of Fig. 1.

As shown in Fig. 1, a plate 29 is mounted on the headstock plate 19 and has a dovetail 30 to which a valve housing 31 is clamped in adjusted position. A piston housing 32 is mounted by bolts 32a received through slots therein on the side of housing 31 toward the grinding wheel, and is keyed at 32b, for vertical adjustment relative thereto. The piston housing has a boss 32c extending toward the grinding wheel 15 and, as shown best in Fig. 3, a shaft 33 is rotatably mounted in, and extends through, the piston housing 32 and boss 32c. The end of the shaft 33 extending outside the housing boss receives a pressure member housing 34 snugly thereon. The shaft has teeth 35 engaging the rack 36 of rack piston 37 which reciprocates in cylinder 38 to rotate the shaft 33 and hence the housing 34. The end of the shaft 33 opposite the housing 34 extends beyond the face of piston housing 32 and is rotatably received in a bushing 41 which is snugly received in the block 39 connected to the face of housing 32. The shaft 33 has a bore 40 extending therethrough, terminating within the housing 34 and blocked at the opposite end by plug 42. The bushing 41 has internal and external annular grooves 43 and 44 connected by passages 45. The internal grooves 43 communicate, through cross passages in shaft 33, with bore 40 and the external grooves communicate with fitting 46 received in block 39. The fitting 46 has air conduit 47 connected thereto. Thus a passage is provided from conduit 47 to supply air under pressure to the pressure member housing 34.

Figure 4:
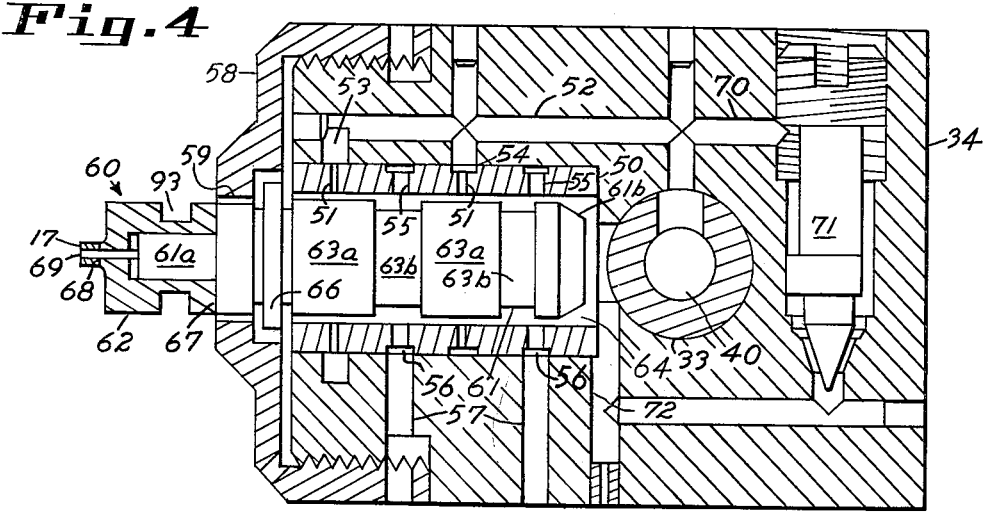
Fig. 4 is a view taken on line 4—4 of Fig. 1.

As shown in Fig. 4, the pressure member housing 34 contains an air bearing 50 snugly received in one end thereof, the bearing having two spaced sets of circumferentially disposed orifices 51 extending therethrough. Air under pressure is supplied from bore 40 through air passage 52 to one set of orifices by the annular groove 53 in the housing, and to the other set of orifices by the external annular groove 54 in the bearing. The bearing 50 also has two sets of circumferentially spaced outlets 55 communicating with external grooves 56 in the bearing which, in turn, are connected to air discharge passages 57 extending through the housing. A cap 58 is threadedly engaged on one end of the housing and has opening 59 therein.

A pressure member 60, comprising a spindle 61 and a sleeve 62, is loosely received in the chamber 64 defined by the air bearing 50, the end 61a of the spindle extending through the opening 59 in the cap 58. The opposite end of the spindle 61b terminates in the chamber 64 at the inner end thereof. The spindle 61 has a land 63a in registration with each set of orifices 51 in the sleeve and a groove 63b adjacent each set of outlets 55. The spindle is axially shiftable in the chamber 64, the axial movement of the spindle being limited in one direction by engagement of the end 61b with the housing 34 and in the opposite direction by engagement of a flange 66 on the spindle with the cap 58. Near the end 61a of the spindle which extends outside the housing there is a shoulder 67 thereon against which the slidable sleeve 62 abuts. The sleeve 62 opposite the shoulder 67 terminates in a pressure face 68 adapted to engage the end of a workpiece 17. The spindle 61 has a finger 69 extending therefrom through the sleeve and beyond the pressure face 68 to loosely receive the annular workpiece 17 thereon.

The bore 40 of shaft 33 also communicates, within the housing, by passage 70 with a needle valve 71 which permits a selected amount of air to pass through passage 72 into the inner end of chamber 64 and against the inner end 61b of spindle 61. When the workpiece on the finger 69 is adjacent the driver face 20a and air under pressure is supplied through bore 40, the spindle 61 floats within the bearing and shifts therein, by virtue of the air under pressure directed against end 61b, to urge the workpiece into driving engagement with face 20a, the spindle being rotated freely by the workpiece after this driving engagement is effected. In a machine constructed in accordance with the present invention, adapted to accommodate small annular workpieces having an outer diameter of between .056 and .125 inch, the diameter of the lands 63a were .50 inch and .002 inch less than the inner diameter of the bearing 50. Thus, if the ends of a particular workpiece are not square, the spindle can tilt to assure that the workpiece engaging face 68 thereon will nevertheless seat fully on the one end of the workpiece and hold the other end thereof in full seating engagement with the driver face 20a to obviate rocking of the workpiece on the driver face during grinding.

Figure 5:
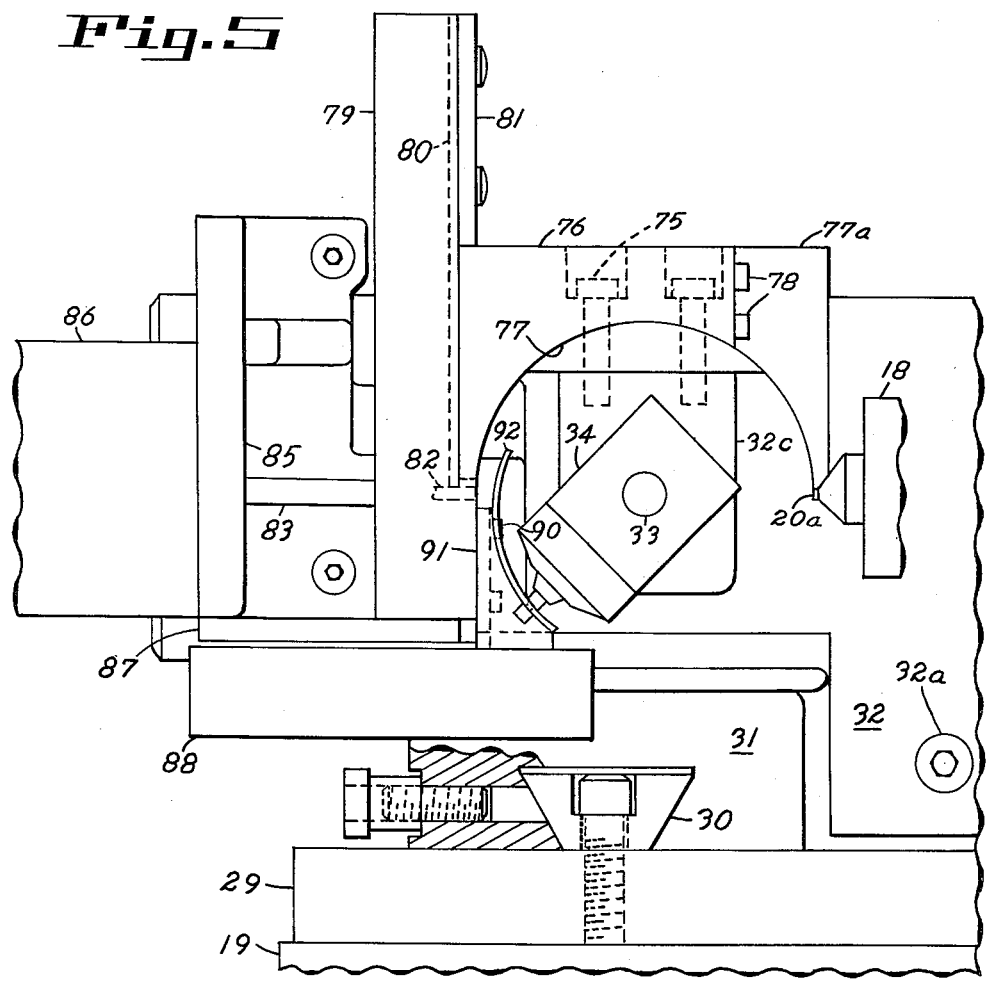
Fig. 5 is a view taken on line 5—5 of Fig. 1.
Figure 6:
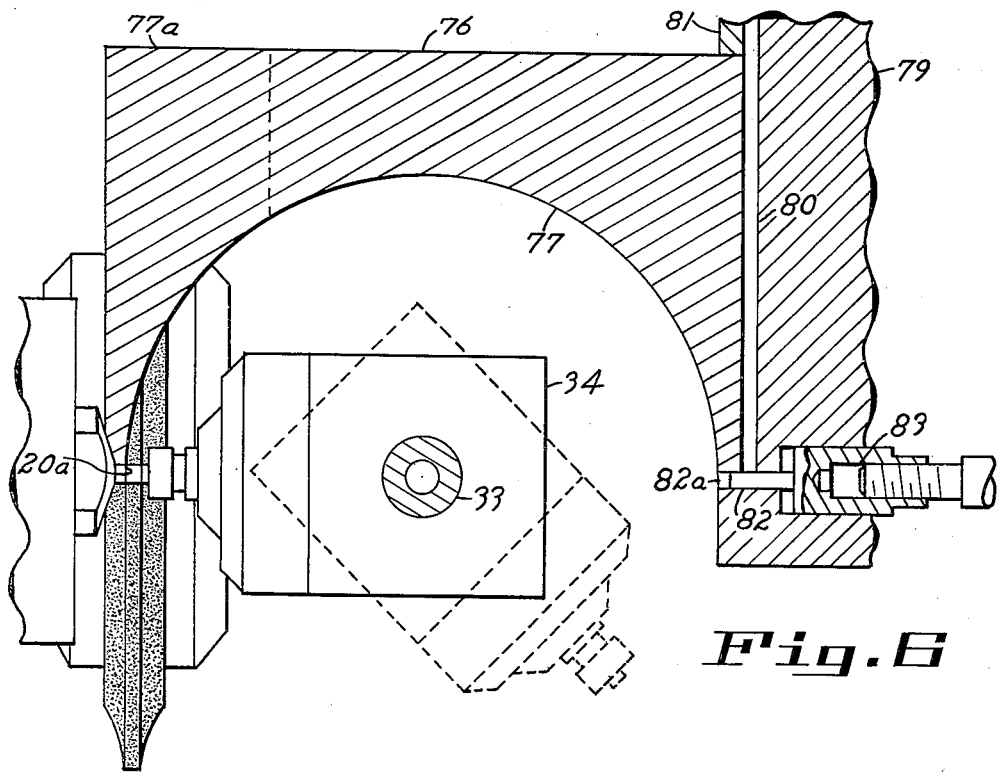
Fig. 6 is a view taken on line 6—6 of Fig. 1.

Mounted on the top of the piston housing boss 32c and connected thereto by bolts 75 is a guide member 76 having a portion defining an arched guide surface 77, as shown in Figs. 5 and 6. There is connected to one end of guide member 76, by bolts 78, a workpiece storage member 79 extending above the guide member and having a chute 80 milled in the face thereof which abuts against the guide member. Above the guide member 76 a plate 81 is connected across this face. The chute 80 terminates at a cross chute 82 having an opening 82a through which workpieces, stored in chute 80 and dropping into chute 82, are discharged. The discharge of workpieces through opening 82a is accomplished by a plunger 83 slidably received in member 79 and extending into cross chute 82. The plunger is retracted to permit a workpiece to drop from chute 80 into cross chute 82 and is then advanced to push the workpiece out the opening 82a. The guide surface 77 extends between the driver face 20a and the chute opening 82a and lies on the circumference of a circle. The end 77a of the portion 77 of the guide member 76 toward the grinding wheel is relatively thin to prevent interference as the grinding wheel is fed into the workpiece. There is connected to the side of the piston housing 32 a bracket 85 having a leg extending outwardly therefrom to which is connected the plunger cylinder 86 which actuates plunger 83. A plate 87 is connected to the underside of this bracket and has horizontal slots 87a which receive the inturned upper flanges 88a of a receptacle 88 to receive finished workpieces.

Figure 7:
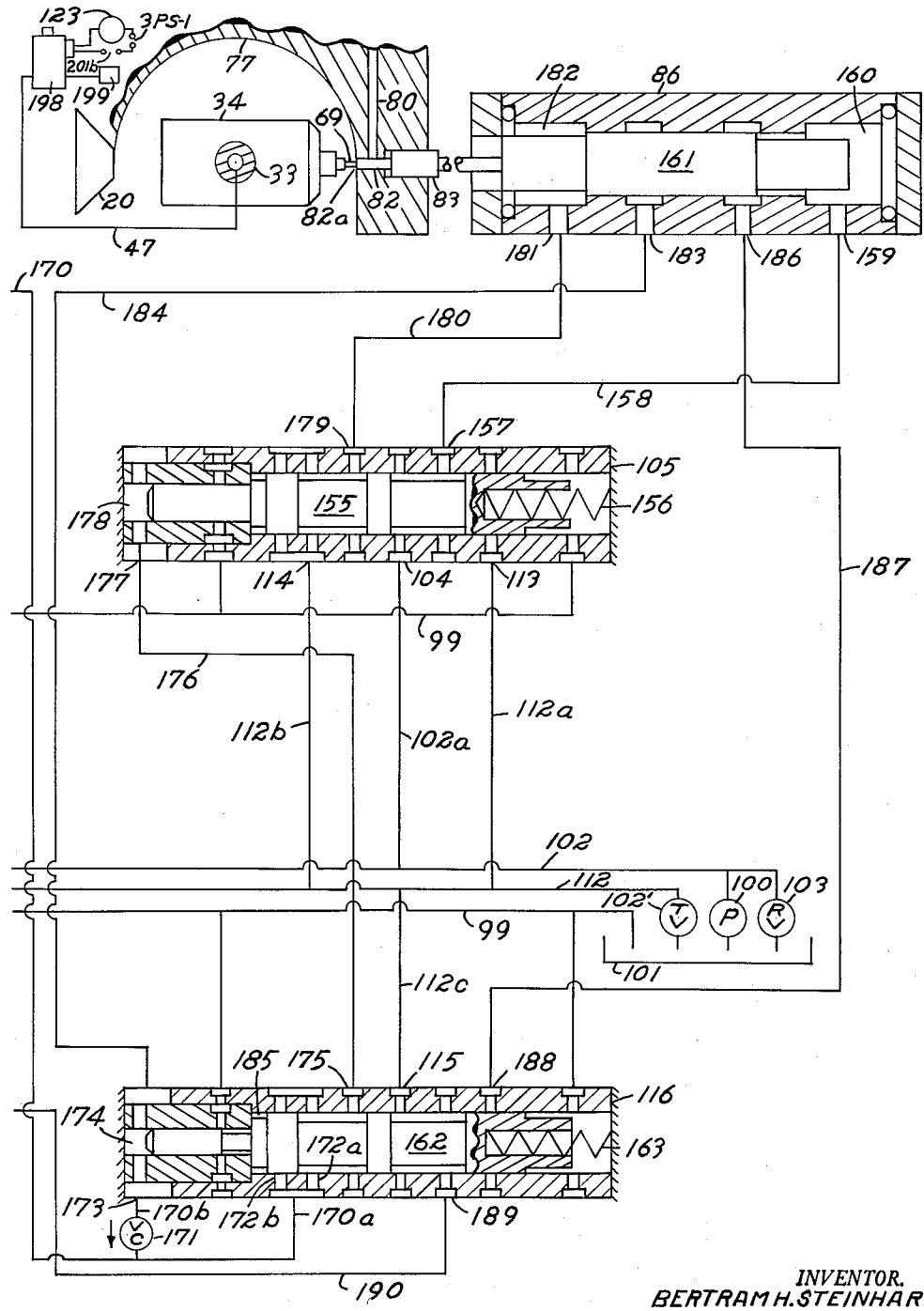

The shaft 33 is mounted in the piston housing 32 so that the shaft is located at the center of the circle on which the guide surface 77 lies and thus the pressure member housing 34 swings about this center. When the rack piston 37 is positioned to hold the pressure member housing in a loading position (as shown in Fig. 7), the finger 69 of the pressure member 60 is in registration with opening 82a and closely spaced relative to surface 77 so that a workpiece discharged through the opening 82a is received on finger 69. As the housing 34 swings counterclockwise (as viewed in Fig. 7) to a grinding position about its pivot defined by the shaft 33 the workpiece is held on the finger 69 between pressure face 68 and guide surface 77. At the grinding position of the pressure member housing 34 (shown in solid lines in Fig. 6), the workpiece is deposited on the shoes 28, the finger 69 remaining in the workpiece during grinding. The finger is smaller than the inner diameter of the workpiece 17 so the workpiece is urged by the driver down on the shoes and is positioned thereby. After grinding the housing is reversely swung to a discharge position (shown in Fig. 5 and in dotted lnes in Fig. 6) beyond the guide surface 77.

There is mounted on the guide member 76 by bolts 90 a stripping member 91 having an arcuate flange 92 curving eccentrically relative to the circular path traveled by the sleeve 62 of pressure member 60. The sleeve has a groove 93 which is engaged by the flange 92 as the housing 34 approaches its discharge position and the eccentric flange causes the sleeve to slide outwardly on the shaft, the workpiece engaging pressure face 68 thereof stripping the workpiece from the finger. The stripped workpiece drops into the receptacle 88 for finished workpieces.

The plate 29 is pivotally connected to the headstock plate 19 at 94 and is clamped in operating position by bolts 95. The bolts 95 may be disengaged from plate 29 so that the plate 29 can be swung relative to the headstock plate thereby swinging the members mounted thereon away from the headstocks to permit access to the headstock and the workpiece supporting shoes for adjustment. The headstock plate 19 is mounted on a swivel plate (not shown) so that the workpiece may be inclined relative to the grinding wheel 15, if desired, and the swivel plate is mounted on a cross slide (not shown) mounted on the base 16 so that the workpiece can be laterally positioned relative to the wheel if desired.

The hydraulic system of the present invention is shown in Figs. 7 and 8. In the system there is a pump 100 which receives hydraulic fluid from a sump 101 to deliver fluid under pressure to the pressure line 102. A relief valve 103 discharging to sump 101 is connected to pressure line 102 to determine the pressure in that line. Pressure line 102 has a branch 102a connected to pressure port 104 of valve 105, a branch 102b connected to pressure port 106 of valve 107, a branch 102c connected to pressure port 108 of valve 109, and a branch 102d connected to pressure port 110 of valve 111. The system has a return line 112 discharging into the sump 91 through a throttle valve 102' which maintains a slight back pressure in the return line 112. Return line 112 has branch lines 112a and 112b connected, respectively, to discharge ports 113 and 114 of valve 105, branch line 112c connected to discharge port 115 of valve 116, branch line 112d connected to discharge port 117 of valve 107, branch line 112e connected to discharge port 118 of valve 109, branch line 112f connected to discharge port 119 of valve 111, and branch line 112g connected to discharge port 120 of valve 121. The system also has a return line 99 in which no back pressure is maintained.

When the grinding wheel 15 is fully retracted and before switch 122, which is connected in series with a source of energy 123 and solenoid 11S, is closed, both solenoids 11S and 10S are deenergized. Thus valve member 124 of valve 107 is held in the left hand position by spring 125 and valve member 126 of valve 109 is held in the right hand position by spring 127. With valve member 126 in the right hand position, pressure port 108 of valve 109 is connected to motor port 128 thereof and pressure is communicated through the valve to line 129 connected to port 128. Line 129 has a branch 129a connected to port 130 of valve 107, a branch 129b connected to port 131 of valve 111 and a branch 129c connected to port 132 of valve 121. At this time the valve member 133 of valve 121 is held in the left hand position by spring 134 and the pressure in branch line 129c is communicated through the valve to port 135 thereof. Port 135 is connected to line 136 and pressure is therefore present in chamber 137 of cylinder 38, line 136 being connected to chamber 137 through branch line 136a, branch line 136b containing check valve 138, and branch line 136c containing throttle valve 139. Cylinder 38 contains the rack piston 37, a piston 140 having a larger diameter than the rack piston, and a piston 141 slidably received in piston 140 and having a smaller diameter than the rack piston. At this time these three pistons are in their extreme right hand position, the piston 140 abutting against shoulder 142 of the cylinder, the piston 141 extending beyond the end of piston 140 and abutting against rack piston 37, and the rack piston abutting against the end of the cylinder 38. With the rack piston in this position the pressure member housing 34 is held in the discharge position. The inner piston 141 has a passage 143 which communicates with passage 144, extending through outer piston 140, which, in turn, is connected to port 145 in cylinder 38 when the pistons are in the position shown. Therefore, pressure is present in line 146, which is connected between port 145 and port 147 of valve 107, at this time.

With pressure in branch line 129b and the left end chamber 148 of valve 111, valve member 149 of that valve is shifted to its right hand position. Thus, motor port 150, of that valve, which has line 151 connected thereto, is connected through the valve to discharge port 119. End chamber 152 of cylinder 38 is connected, at this time, to line 151 through branch line 150a, containing throttle valve 153, and, after the rack piston shifts to the left, also through branch line 150b, containing check valve 154, and branch line 150c.

Valve member 155 of valve 105 is held, at this time, in the left hand position by spring 156 and pressure is transmitted through that valve from pressure port 104 to motor port 157. Port 157 is connected by line 158 to port 159 of the plunger cylinder 86 and pressure is therefore transmitted to end chamber 160 thereof, holding piston 161 in the left hand position to hold plunger 83, which is connected to piston 161, in the advanced position. Also at this time, the valve member 162 of valve 116 is held in the left hand position by spring 163.

To begin the loading cycle the switch 122 is closed to connect the solenoid 11S, which operates plunger 164, across the source of electrical energy 123. Energization of solenoid 11S shifts the plunger 164 a short distance to the right to urge the valve member 124 of valve 107 to an intermediate position, indicated in dotted lines, just beyond the port 147. Since, at this time, there is pressure in the line 146 connected to port 147, the valve member 124 is fired to its extreme right hand position. The switch 122 remains closed throughout the loading cycle and may either be opened at the end of the cycle, to discontinue loading, or may remain closed for continuous loading.

When valve member 124 is shifted to the right pressure port 106 of valve 107 is connected through the valve to port 165 which has a line 166 connected thereto. Line 166 is connected to port 167 of valve 111 and pressure is transmitted to end chamber 168 of that valve. The area of valve member 149 exposed to chamber 168 is greater than the area exposed to the opposite end chamber 148, so, despite the fact that chamber 148 is connected to pressure at this time, the valve member 149 is shifted to the left. This connects pressure port 110 of that valve to port 150 and pressure is transmitted through the valve to line 151 and end chamber 152 of cylinder 38. Although pressure is present at this time in the opposite end chamber 137, the rack piston 37, since it is of greater diameter than piston 141, is shifted to the left until it abuts against piston 140 where it is stopped since the combined end areas of pistons 140 and 141 is greater than the end area of piston 37. The shifting of piston 141 disconnects line 146 from chamber 137 but valve member 124 of valve 107 is held in the right hand position by pressure transmitted through port 130 of the valve. This movement of the rack piston swings the pressure member housing 34 from the discharge position to the loading position.

As the rack piston 37 approaches piston 140, port 169 of cylinder 38 is uncovered and pressure is introduced to line 170 connected to that port. This line is connected by branch lines 170a and 170b, the latter containing check valve 171, to valve 116. Branch line 170b is connected to port 173, which communicates with end chamber 174 but, since transmission of pressure thereto is blocked by check valve 171, valve member 162 remains in the left hand position. Branch line 170a is connected to port 172a and pressure is transmitted through the valve to port 175, to which line 176 is connected. Line 176 is connected to port 177 of valve 105 which communicates with end chamber 178 and the valve member 155 is shifted to the right. This disconnects pressure port 104 from port 157 and connects it to port 179. Port 157 is simultaneously connected to discharge port 113. Port 179 is connected by line 180 to port 181 of plunger cylinder 86 and communicates with end chamber 182 therein. The piston 161 is thus shifted to the right, retracting plunger 83 and allowing a workpiece to drop from the loading chute 80 into the cross chute 82. As the piston 161 approaches its extreme right hand position pressure is transmitted through the cylinder to port 183. This port is connected by line 184 to port 173 of valve 116, and pressure is introduced to end chamber 174 thereof. Thus, the valve member 162 is shifted to the right, disconnecting port 172a from port 175 and connecting the latter port to discharge port 115. This connects chamber 178 of valve 105 to exhaust and the valve member 155 thereof is shifted to the left by spring 156. Thus, again, port 157 and line 158 are connected to pressure through the valve 105, and port 179, which is connected to line 180, is connected to discharge port 114. Thus, in the plunger cylinder 86, chamber 160 is connected to pressure and chamber 182 is connected to exhaust to shift the piston 161 to the left and actuate the plunger 83 to push a workpiece onto finger 69 of pressure member 60. Although the pressure in line 184 is relieved when chamber 182 is connected to exhaust the valve member 162 of valve 116 is held in its right hand position because, when the valve member 162 is in its right hand position, the chamber 185 is connected to pressure through the port 172b.

With the plunger piston 161 in the left hand position, pressure is transmitted through chamber 160 to port 186 of cylinder 86 and to line 187 connected thereto. Line 187 is connected to port 188 of valve 116, which is blocked when the valve member 162 is in the left hand position but connected to port 189 of the valve when the valve member is in the right hand position as it is at this time. Therefore pressure is supplied to line 190, connected to port 189 and, through that line, to port 191 of valve 121 which communicates with end chamber 192 thereof. This shifts valve member 133 of valve 121 to the right to disconnect port 132 from port 135 and connect the latter to discharge port 120. This connects line 136 and chamber 137 to exhaust and the rack piston 37, and pistons 115 and 116, shift to the left, the final movement of the piston 140 closing branch line 136a and confining discharge through the line 136c containing throttle valve 139 to cushion the impact of pistons 140 and 141 against the adjustable stop 193 in cylinder 38. With the rack piston 37 in the left hand position the housing 34 is in the grinding position with the workpiece deposited on shoes 28.

As the rack piston approaches its left hand position port 194 of cylinder 38 is uncovered to supply pressure through line 195 to chamber 196 of cylinder 197. This moves piston 184, against the action of spring 185, to operate switch 3PS. The normally open contacts 3PS1 of this switch, and normally closed contacts 201b of a relay 201 which is deenergized at this time, are connected in series with a normally closed electrically operated pneumatic valve 198 in the air line 47 which is connected to a source 199 of air under pressure. At this time contacts 3PS1 close and valve 198 is opened to pass air to the pressure member housing 34. This floats the spindle 61 and also urges the workpiece 17 into driving engagement with driver face 20a, the workpiece being pinched between face 20a and pressure face 68 and held in operating position on the shoes. Switch 3PS also has contacts, not shown, operable to commence movement of the grinding wheel toward the workpiece.

When the grinding operation is completed a signal is given, as for example, by a tarry timer, which closes contacts 200 and thereby energizes relay 201 to close normally open contacts 201a of that relay, connected across contacts 200, to seal in the relay. At this time contacts 201b open to shut off the air to the pressure member housing 34. Thus, solenoid 10S is energized when the grinding is completed and remains energized until the normally closed switch 202 is opened by the grinding wheel when it reaches its fully retracted position. When solenoid 10S is energized valve member 126 is shifted to the left, disconnecting pressure port 108 from port 128 and connecting the latter port to discharge port 118. This connects line 129 to exhaust and permits valve member 124 of valve 107 to shift to its intermediate position. This blocks pressure port 106 of that valve and connects port 165 thereof to discharge port 117. Thus, both lines 129 and 166 are connected to return line 112 and valve member 149 remains in the left hand position.

When the grinding wheel is retracted and the switch 202 opened to deenergize solenoid 10S, valve member 126 returns to the right hand position. This reconnects line 129 to pressure and introduces pressure into chamber 148 of valve 111. Since chamber 168 is connected to exhaust, valve member 149 is shifted to the right. This blocks pressure port 110 and connects port 150 to discharge port 119, connecting chamber 152 of cylinder 38 to return line 112. Although both chambers 137 and 152 of cylinder 38 are connected to return line 112, the pistons start moving slowly to the right since there is a small back pressure in line 112 and since the piston area exposed to chamber 137 is greater than the area exposed to chamber 152. When chamber 152 is connected to line 112, pressure is relieved from chamber 196 of cylinder 197 and switch 3PS is released. Since pressure is also relieved from line 170 valve member 162 of valve 116 is returned to the left hand position. Port 189 of that valve is reconnected to discharge port 115 thereof so pressure is relieved from end chamber 192 of valve 121. This shifts valve member 133 to the left, reconnecting port 132 to port 135. Thus, pressure is again introduced to line 136 and chamber 137 of cylinder 38 to complete the movement of the pistons to their right hand positions. This returns the pressure member housing 34 to the discharge position, stripping the ground workpiece from the pressure member finger.

What is claimed is:

1. In a grinding machine having a headstock with a rotatable driver and workpiece supporting means to hold a workpiece in grinding position at the driver, the combination of storage means to hold unoperated workpieces, a swingable housing, a spindle rotatably mounted in the housing and having means at one end to receive a workpiece, means to transfer a workpiece from the storage means to the spindle, means to swing the housing to deposit said workpiece on the workpiece supporting means, and means to axially shift the spindle to urge a workpiece deposited on the workpiece supporting means into driving engagement with the driver.

2. In a grinding machine having a headstock with a rotatable driving face and workpiece supporting means adapted to engage the outer periphery of an annular workpiece at the driving face, the combination of a chute to hold unoperated annular workpieces, a spindle having at one end means defining a workpiece engaging face and a finger extending beyond said face to loosely receive an annular workpiece thereon, a housing rotatably supporting said spindle and swingable between a loading position with the spindle finger positioned to receive a workpiece from the chute and a grinding position with the spindle finger positioned to deposit a workpiece on the workpiece supporting means, means to shift a workpiece from the chute to the spindle finger when the housing is in the loading position, means to swing the housing from the loading position to the grinding position, and means to shift the spindle axially relative to the housing to pinch the workpiece between the workpiece engaging face and the driving face and hold the workpiece on the shoes in grinding position and in driving engagement with the driving face.

3. In a grinding machine having a workpiece supporting means adapted to engage the outer periphery of an annular workpiece and having a headstock with a rotatable driving face adapted for engagement by one end of a workpiece on the workpiece supporting means, the combination of a chute to hold unoperated workpieces having an opening for the discharge of workpieces therefrom, a guide surface extending between the chute opening and the driving face on the circumference of a circle, a housing pivotally mounted to swing about the center of said circle, an axially shiftable spindle rotatably mounted in said housing and having at one end means defining a workpiece engaging pressure face spaced from the guide surface and a finger extending beyond said pressure face toward the guide surface, means to swing said housing to a loading position with the spindle finger in registration with the chute opening, means to discharge a workpiece from said chute opening onto said finger, means to swing the housing from the loading position to a grinding position with the spindle finger in registration with the driving face and the workpiece thereon engaged with the workpiece supporting means, and means to shift said spindle axially when the housing is in the grinding position to urge the workpiece engaging pressure face against the opposite end of the workpiece for holding said one end of the workpiece in driving engagement with the driving face.

4. In a grinding machine having workpiece supporting means adapted to engage the outer periphery of an annular workpiece and having a headstock with a rotatable driving face adapted for engagement by one end of a workpiece on the workpiece supporting means, the combination of a chute to hold unoperated workpiece having an opening for the discharge of workpieces therefrom, an arched guide surface extending between the chute opening and the driving face on the circumference of a circle, a housing pivotally mounted to swing about the center of said circle, an axially shiftable spindle rotatably mounted in said housing and having at one end means defining a workpiece engaging pressure face spaced from the guide surface and a finger extending beyond said pressure face toward the guide surface, means to swing said housing to a loading position with the spindle finger in registration with the chute opening, means to discharge a workpiece from said chute opening onto said finger, means to swing the housing from the loading position to a grinding position with the spindle finger in registration with the driving face and the workpiece thereon engaged with the workpiece supporting means, means to apply pressure to the opposite end of the spindle when the housing is in the grinding position and urge the workpiece engaging pressure face against the opposite end of the workpiece for holding said one end of the workpiece in driving engagement with the driving face, and means to reversely swing the housing to a discharge position with the spindle finger beyond said guide surface.

5. In a grinding machine having workpiece supporting means adapted to engage the outer periphery of an annular workpiece and having a headstock with a rotatable driving face adapted for engagement by one end of a workpiece on the workpiece supporting means, the combination of a chute to hold unoperated workpieces having an opening for the discharge of workpieces therefrom, an arched guide surface extending between the chute opening and the driving face on the circumference of a circle, a housing pivotally mounted to swing about the center of said circle, an axially shiftable spindle rotatably mounted in said housing and having a shoulder thereon and a finger extending from one end, a sleeve with a workpiece engaging pressure face thereon slidably carried at said one end of the spindle beyond said shoulder, the spindle finger extending beyond said pressure face, means to swing said housing to a loading position with the spindle finger in registration with the chute opening, means to discharge a workpiece from said chute opening onto said finger, means to swing the housing from the loading position to a grinding position with the spindle finger in registration with the driving face and the workpiece thereon engaged with the workpiece supporting means, means to apply pressure to the opposite end of the spindle when the housing is in the grinding position and urge the workpiece engaging pressure face against the opposite end of the workpiece for holding said one end of the workpiece in driving engagement with the driving face during grinding operation, means to release said pressure from the spindle after the grinding operation, means to reversely swing the housing to a discharge position with the spindle finger beyond said guide surface, and means to shift the sleeve on the spindle towards the end of the spindle finger as the housing approaches the discharge position to strip the workpiece therefrom.

6. In a machine tool, the combination of a driver adapted to rotate a workpiece received at the driver and held thereagainst, a pressure member having means to receive a workpiece, means defining an air bearing rotatably supporting said pressure member and movable to and from a grinding position to carry a workpiece received on the pressure member to and from the driver, and means to urge the pressure member toward the driver when the air bearing is in the grinding position to hold the workpiece against the driver.

7. In a grinding machine having a headstock with a rotatable driving face adapted to receive thereagainst one end of an annular workpiece, said machine having workpiece supporting means adjacent the driving face to engage the periphery of the workpiece, the combination of storage means to hold unoperated workpieces, a swingable housing having a chamber therein, a spindle loosely received in the chamber and terminating therein, the spindle having means defining a pressure face at one end outside the chamber adapted to engage the opposite end of the workpiece, said spindle having a finger extending beyond said pressure face to receive and carry a workpiece thereon, means to shift a workpiece from said storage means to said finger, means to swing said housing to carry the workpiece to the workpiece supporting means, means to pass air under pressure through said chamber and about said spindle to float the same within the chamber, and means to pass air under pressure into said chamber against said opposite end of the spindle to shift the same axially toward the rotatable headstock face and urge the workpiece into driving engagement therewith.

8. In a grinding machine having a headstock with a rotatable driving face adapted to receive thereagainst one end of an annular workpiece, said machine having workpiece supporting means adjacent the driving face to engage the periphery of the workpiece, the combination of storage means to hold unoperated workpieces, an arcuate guide surface extending between the storage means and the workpiece supporting means, a swingable housing having a chamber therein, a spindle loosely received in the chamber and terminating therein, the spindle having means defining a pressure face at one end outside the chamber adapted to engage the opposite end of the workpiece, said spindle having a finger extending beyond said pressure face to receive and carry a workpiece thereon, means to shift a workpiece from said storage means to said finger, means to swing said housing to carry the workpiece along the guide surface to the workpiece supporting means, means to pass air under pressure through said chamber and about said spindle to float the same within the chamber, and means to pass air under pressure into said chamber against said opposite end of the spindle after the workpiece has reached the workpiece supporting means to shift the spindle axially toward the rotatable headstock face and urge the workpiece into driving engagement therewith.

References Cited in the file of this patent

UNITED STATES PATENTS

| | | |
|---|---|---|
| 2,478,607 | Theler et al. | Aug. 9, 1949 |
| 2,624,985 | Happel | Jan. 13, 1953 |
| 2,799,977 | Jones et al. | July 23, 1957 |
| 2,828,588 | Durland | Apr. 1, 1958 |
| 2,927,406 | Terp | Mar. 8, 1960 |